United States Patent [19]

Kulkarni et al.

[11] Patent Number: 5,494,609
[45] Date of Patent: Feb. 27, 1996

[54] ELECTRICALLY CONDUCTIVE COATING COMPOSITIONS AND METHOD FOR THE PREPARATION THEREOF

[76] Inventors: Vaman G. Kulkarni, 9944 Deer Spring La., Charlotte, N.C. 28210; William R. Mathew, 120 Guise Park Dr., Munroe Falls, Ohio 44262; Lawrence W. Shacklette, 11 Alden Pl., Maplewood, N.J. 07040; John C. Campbell, 227 N. Firestone Blvd., Akron, Ohio 44301

[21] Appl. No.: 220,402

[22] Filed: Mar. 30, 1994

Related U.S. Application Data

[63] Continuation of Ser. No. 869,470, Apr. 15, 1992, abandoned.

[51] Int. Cl.$^6$ ............................. H01B 1/00; H01B 1/06; H01B 1/12; B32B 19/00
[52] U.S. Cl. .................. 252/500; 428/357; 428/364; 428/375; 528/422; 528/423
[58] Field of Search ......................... 252/500, 512, 252/518; 428/357, 364, 375; 528/422, 423

[56] References Cited

U.S. PATENT DOCUMENTS

| | | | |
|---|---|---|---|
| 4,052,493 | 10/1977 | Etchells | 264/49 |
| 4,061,827 | 12/1977 | Gould | 428/368 |
| 4,129,677 | 12/1978 | Boe | 428/372 |
| 4,526,706 | 7/1985 | Upson et al. | 252/500 |
| 4,604,427 | 8/1986 | Roberts et al. | 525/185 |
| 4,617,228 | 10/1986 | Newman et al. | 428/265 |
| 4,665,129 | 5/1987 | Naarmann et al. | 252/500 |
| 4,772,421 | 10/1988 | Ikenaga et al. | 252/500 |
| 4,838,756 | 5/1989 | Benton et al. | 252/518 |
| 4,855,361 | 8/1989 | Yaniger et al. | 525/436 |
| 4,929,388 | 5/1990 | Wessling | 252/500 |
| 4,935,164 | 6/1990 | Wessling et al. | 252/500 |
| 4,983,322 | 1/1991 | Elsenbaumer | 252/500 |
| 4,983,690 | 1/1991 | Cameron et al. | 525/436 |
| 5,006,278 | 4/1991 | Elsenbaumer | 427/385.5 |
| 5,021,193 | 6/1991 | Armes et al. | 252/500 |
| 5,034,463 | 7/1991 | Brokken-Zijp et al. | 252/518 |
| 5,079,096 | 1/1992 | Miyake et al. | 428/500 |
| 5,115,057 | 5/1992 | Ono et al. | 526/256 |
| 5,217,649 | 6/1993 | Kulkarni et al. | 252/500 |

FOREIGN PATENT DOCUMENTS

| | | |
|---|---|---|
| 0421814A2 | 10/1991 | European Pat. Off. . |
| 61-127737 | 5/1987 | Japan . |
| 2214511 | 5/1989 | United Kingdom ............ C08K 3/00 |
| WO89/01694 | 2/1989 | WIPO . |
| WO89/02155 | 3/1989 | WIPO . |
| WO90/10297 | 9/1990 | WIPO . |

OTHER PUBLICATIONS

"An Electrically Conductive Plastic Composite Derived from Polypyrrole and Poly(vinyl Chloride)" by DePaoli et al, *Journal of Polymer Science*, vol. 23 (1985).

"Conducting Polymer Fibre Prepared by Melt–Spinning Method from Fusible Polythiophene Derivative" by Yoshino et al., Polymer Communications, 1987 vol. 28 pp. 309–310. November.

"Electrically Conductive Fibers of Polyaniline Spun From Solutions in Concentrated Sulfuric Acid", *Synthetic Metals*, 26, (1988) pp. 383–389.

"Spectroscopic Studies of Polyaniline in Solution and in Spin–Cast Films" by Can et al, *Synthetic Metals*, 32 (1989) pp. 263–281.

United States Statutory Invention Registration No. H944 by Wade Jr., et al, Published Aug. 6, 1991.

*Primary Examiner*—Christine Skane
*Assistant Examiner*—M. Kopec
*Attorney, Agent, or Firm*—Renner, Kenner, Greive, Bobak, Taylor & Weber

[57] ABSTRACT

An electrically conductive coating composition includes an intrinsically conductive polymer dispersed in a film-forming thermoplastic matrix. The coating composition also includes at least one organic solvent capable of dissolving the dispersion. A method according to the invention includes the steps of preparing a dispersion of an intrinsically conductive polymer in a film-forming thermoplastic matrix. The method also includes the steps of dissolving the dispersion in an organic solvent and forming a film from the dissolved dispersion.

10 Claims, No Drawings

5,494,609

ELECTRICALLY CONDUCTIVE COATING COMPOSITIONS AND METHOD FOR THE PREPARATION THEREOF

This application is a File Wrapper Continuation of U.S. patent application Ser. No. 07/869,470, filed Apr. 15, 1992, now abandoned.

TECHNICAL FIELD

This invention relates to electrically conductive coatings and films. More particularly, the present invention relates to coating compositions and films made by dispersing an electrically conductive polymer in a thermoplastic matrix. Specifically, the present invention relates to electrically conductive coatings prepared from a dispersion of an intrinsically conductive polymer such as doped polyaniline, in a thermoplastic matrix.

BACKGROUND OF THE INVENTION

Intrinsically conductive polymers (ICPs) have been studied since at the latest 1970's. The term "intrinsically conductive polymer" refers to organic polymers containing polyconjugated bond systems such as double or triple bonds and aromatic rings which have been doped with electron donor dopants or electron acceptor dopants to form a charge transfer complex having an electrical conductivity of at least about $10^{-8}$ S/cm by the four-in-line probe method. Examples of such polymers are polyaniline, polypyrrole, polyacetylene, polythiophene, and the like.

A good overall review of intrinsically conductive polymers, their synthesis, chemical structure and processing is to be found in "Synthetic Metals", volumes 17–19 (1987), 28–30 (1989) and 40–42 (1991).

The term polyaniline covers a whole range of polymers made from aniline and aniline derivatives. The term "doped" polyaniline as used herein is understood to refer to the conductive emeraldine salt form of polyaniline as opposed to the neutral emeraldine base form which is non-conductive. The neutral form of the polymer can be doped (protonated) by protonic acids, to give the doped polymer.

Processing of ICPs has been limited due to their inherent properties. They are infusible and insoluble in most solvents in their doped (conductive) form. Several techniques have been suggested for improving their solubility and processing. These include synthesis of substituted polymers and graft polymers. These techniques have generally yielded polymers with low conductivity and low solubility in their undoped (non-conductive) and doped (conductive) forms. Blends of ICPs are suggested in U.S. Pat. Nos. 4,935,164 and 4,929,388, PCT Application Nos. WO 89/02155, WO 90/10297 and WO 89/01694, and European Patent Application 0421814 A2 and British Patent No. 2,214,511, which present a generally useful process for making a variety of articles.

Several solution processing techniques have been described in the art for preparing films from conductive polymers such as polyaniline. An example of this is found in U.S. Pat. No. 4,983,322.

However, this prior art does not disclose conductive compositions suitable for making thin and/or transparent films with good adhesion to the material which is coated, and which are also tough and scratch resistant, and which retain their conductivity when exposed to common cleaning solvents such as water, alcohols and detergents. All of these attributes are required for applications such as antistatic packaging for electronic components, other electronic applications and the like.

SUMMARY OF INVENTION

It is therefore, an object of the present invention to provide electrically conductive films, which are tough, abrasion resistant and stable to common cleaning solvents and detergents.

It is another object of the present invention to provide electrically conductive films which are transparent and optically clear.

It is yet another object of the present invention to provide electrically conductive films from intrinsically conductive polymers such as doped polyaniline.

It is still another object to provide a method for preparing an electrically conductive film from doped polyaniline.

It is a further object of the present invention to provide a coating composition from a dispersion of doped polyaniline in a thermoplastic film forming matrix.

It is yet another object to provide a method for preparing an electrically conductive film which is transparent.

In general, the present invention relates to an electrically conductive coating composition which comprises a dispersion comprising a solution which comprises a film-forming thermoplastic polymer dissolved in an organic solvent having dispersed therein particles of an intrinsically conductive polymer.

There is also provided a method of preparing an electrically conductive film which comprises the steps of preparing a dispersion comprising particles of an intrinsically conductive polymer having a particle size equal to or less than 400 nm in a film-forming thermoplastic polymer by dispersing the particles in the melt of the thermoplastic; dissolving the dispersion in an organic solvent to form a coating composition; and, forming a film from the coating composition.

Another aspect of the invention relates to an article comprising: a substrate; and an electrically conductive coating on a surface of the substrate, the coating comprising particles of a doped intrinsically conductive polymer dispersed in a matrix comprised of a thermoplastic polymer wherein the particle size of the intrinsically conductive polymer is equal to or less than about 400 nm. A preferred article is one wherein the thermoplastic polymer is more hydrophobic than nylon 6, such as poly(vinyl chloride), poly(methylmethacrylate), styrenic polymers and the like.

Another preferred article is a substrate coated by an electrically conductive coating wherein the loading of the intrinsically conductive polymer particles having a particle size equal to or less than 400 nm in the coating and the thickness of the coating is such that the coating is transmissible to at least about 10 percent of the energy of the visible light spectrum, more preferably to at least about 50 percent, and most preferably to at least about 75 percent.

At least one or more of the foregoing objects, together with the advantages thereof over the known art relating to electrically conductive polymeric compositions, which shall become apparent from the specification which follows, are accomplished by the invention as hereinafter described and claimed.

PREFERRED EMBODIMENT FOR CARRYING OUT THE INVENTION

According to the present invention, novel electrically conductive coating compositions and films are provided.

Films according to the present invention are formed from a dispersion of an intrinsically conductive polymer dispersed in a film-forming thermoplastic matrix where the size of the dispersed phase is equal to or less than about 400 nanometers (nm), more preferably less than about 200 nm and most preferably from about 20 to about 200 nm. The dispersion is then dissolved in an appropriate organic solvent and formed into a film.

Preferably, the intrinsically conductive polymer is doped polyaniline. Such polyaniline is described for example, in PCT Application Nos. WO 89/02155, WO 90/10297 and WO 89/01694. However, as will be appreciated by one skilled in the art, the present invention has application to other intrinsically conductive polymers in addition to polyaniline, other than as described therein and other than polyaniline, such as those discussed hereinabove.

For purposes of exemplifying the present invention, the following discussion will make reference to doped polyaniline, it being understood that other intrinsically conductive polymers are within the scope of the invention.

Any thermoplastic which will form a film upon being dissolved, plasticized or otherwise treated (a "film-forming" thermoplastic) is within the scope of the present invention. The specific thermoplastic polymer chosen should have a melting point or glass transition temperature below the decomposition temperature of the intrinsically conductive polymer. Examples of useful thermoplastic polymers include acrylic polymers including polymethyl methacrylate; polyester; polycarbonate; polyvinyl chloride and copolymers thereof with vinyl acetate; amorphous nylons; styrenic polymers; and, mixtures thereof. Preferred polymers are hydrophobic polymers such as poly(vinyl chloride), poly(methylmethacrylate), styrenic polymers, copolymers and mixtures thereof, and the like.

Preferably the dispersion includes from about 1 to about 50 percent by weight of an intrinsically conductive polymer such as polyaniline, and from about 99 to about 50 percent by weight of the solids comprising the thermoplastic materials and any additional solid additives. The dispersion may also contain other additives such as plasticizers, surfactants and processing aids. When the dispersion contains such additives, the amount of the thermoplastic matrix is reduced by an amount corresponding to the amount of additive added.

The intrinsically conductive polymer normally in the solid form is dispersed in a melt of the thermoplastic matrix in a melt blending process where the dispersion is prepared using any conventional melt processing apparatus, as for example, single or twin screw extruders, Banburys, two roll mills, or the like.

After preparation, the dispersion is allowed to cool such that the thermoplastic polymer returns to its solid state, with particles of the intrinsically conductive polymer uniformly or substantially uniformly dispersed therein. The dispersion is then admixed with an organic solvent for the matrix polymer using intensive mixers such as high speed stirrers, ball mills or the like, to achieve a particle size equal to or less than about 400 nm, preferably equal to or less than about 200 nm, more preferably from about 20 nm to about 200 nm. Although the actual amount of dissolution and mixing or grinding will be varied based upon the dispersion polymers chosen and the end use of the composition, an exemplary amount of grinding would reduce the dispersion components to a size so that a smooth coating can be obtained. In a preferred embodiment of this invention, the particle size of any solids are less than a wavelength of visible light (less than about 400 nm) so that an optically clear coating can be obtained. The coating is transmissible to at least about 10 percent of the energy of the visible light spectrum, more preferably to at least 50 percent and most preferably to at least about 75 percent. Dissolution and mixing will take place for as long as is necessary to produce the desired particle size, and may continue for from about 1 to 72 hours or more. Grinder components such as glass beads or the like may also be employed to enhance dissolution and mixing.

Typically, the amount of solvent employed will vary between 5 to 20 parts by weight of solvent for every 1 part by weight of the dispersion. As will be appreciated by one skilled in the art, the amount of the organic solvent employed will also be dependant upon the actual thermoplastic or thermoplastics selected, as well as the processability characteristics required. For example, certain film forming equipment will require a greater amount of the thermoplastics to be dissolved than other process equipment. Therefore, one skilled in the art will select the proper amount of the solvent in order to form a properly processible film. Also, the thickness of the film required, which will vary as an independent characteristic of the present invention, will determine the amount of solvent employed.

The solvent employed in the dissolution of the matrix polymer and the mixing of the dispersion may be any organic solvent capable of dissolving the thermoplastic polymer to form a solution of the polymer (concentration at least about 1 percent, preferably from about 3 percent to about 30 percent) having particles of suitable size for forming a film from the thermoplastic matrix. As such, the solvent must be capable of dissolving the thermoplastic or thermoplastics employed therein. For example, toluene, acetone, xylene, methyl ethyl ketone, DMSO, NMP, gamabutyrolactone, methyl isobutyl ketone, cyclohexanone and the like, may be employed. The solvent of choice has low toxicity and is environmentally acceptable. As discussed hereinabove, the amount of solvent used will vary depending upon the nature of the thermoplastic to be dissolved, as well as the intended coating application of the resulting film.

During the dissolution and mixing operation, additional additives such as surfactants, plasticizers, additional film-forming thermoplastic or thermosetting resins (such as vinyl and acrylic resins, styrenics, polyesters, polyurethanes and the like) or other solvents may be added to improve the dispersion and film forming properties of the dissolved and ground dispersion. It is preferred that an effective amount of at least one dispersion or film enhancing additive be added. By "effective" amount it is understood to mean an amount which modifies the dissolved dispersion for optimum film forming quality. The optimum quality, of course, will vary depending upon the application for which the film is made, and the actual effective amount will, therefore, vary from application-to-application. One skilled in the art will readily comprehend the effective amount based upon the specific application.

Examples of useful surfactants would include organic phosphate esters and soyalecithin. In regard to the choice of plasticizers, while any conventional plasticizer compatible with the matrix can be used during the dissolution and mixing process, highly polar plasticizers such as sulfonamides, phosphate and benzoate esters are preferred for inclusion with the thermoplastic during the preparation of the conductive dispersion. Solvents include those described hereinabove. Following the addition of these dispersion and film enhancing additives, the solution may be mixed for an additional period of time. The use of the additional dispersion/film enhancing and/or film-forming additives is optional, and will be selectively employed based upon the film and coating requirements of the use for which the invention is to be made.

Following dissolution and mixing, the dissolved and ground dispersion is then coated onto a plastic, glass or other substrate, such as by dipping, spraying or by use of applicators to provide an article having a surface having a resistivity which is less than that of the substrate. The extent to which the resistivity is decreased will vary widely depending on the uses of the article. For example, if used as an antistatic article then resistivity will be from about $10^9$ to about $10^7$ Ohms/square, if used as an article for electrostatic dissipation then resistivity will be from about $10^7$ to about $10^4$ Ohms/square, and if for electromagnetic interference shielding then from about 10 Ohms/square to about 0.1 Ohms/square. For example, in the case of polyaniline, a coated substrate may be provided with a surface resistivity of from about $10^9$ to about 10 Ohms/square and is green in color. In the preferred embodiments of this invention the particle size of the intrinsically conductive polymer particles are less than the wavelength of light (about 400 nm), and the coating on the substrates is also transparent. Electrically conductive films according to the present invention are useful for example, in producing antistatic packaging, in electronic applications, antistatic floor and wall coverings, fibers and the like. By virtue of their transparency, the coatings do not interfere with designs, printing, or the like on the underlying substrate. In the preferred embodiments of this invention, the coatings are formed from a dispersion of doped polyaniline in a hydrophobic thermoplastic polymer or thermoplastic polymers, the films show improved resistance to water, alcohols or an alkaline environment compared to films cast from solutions containing no polymer matrix. For this purpose, it is preferred that the matrix thermoplastic be water, alcohol and alkali resistant.

When the composition contains an additional film-forming resin, which may be added during the dissolution and mixing operation as discussed above, the amount of the total film-forming resin is adjusted such that the conductive polymer content in the dried coating is between 1 and 40 percent by weight. The ratio of the thermoplastic dispersion to the additional film-forming resin is typically between about 1:0.1 and 1:25 parts by weight. The plasticizer, when present, can be any amount ranging from about 0.1 to about 10 parts by weight or more of the coating composition, and the surfactant typically varies from 0.1 to about 5 parts by weight of the coating composition.

While the additional film-forming resin may be any resin which is useful in accomplishing the objects of the invention, and while it need not be a thermoplastic, examples of useful resins include vinyl and acrylic resins, styrenics, polyesters, polyurethanes and mixtures thereof.

GENERAL EXPERIMENTAL

In order to demonstrate the effectiveness of the present invention in achieving the objects hereof, a number of films were produced according to the present disclosure. The experiments and conductive efficiencies achieved are provided as follows. Unless otherwise noted, all parts are specified by weight.

EXAMPLE NO. 1

A dispersion of doped polyaniline in polymethyl methacrylate (PMMA) was prepared by mixing 40 parts of doral polyaniline with 49 parts of PMMA, 5 parts of a sulfonamide plasticizer, 5 parts of an organic phosphate ester type surfactant and 1 part of a lubricant of montan ester type on a two roll mill at 160° C. The composition had a conductivity of 6.5 S/cm.

EXAMPLE NO. 2

One hundred parts of the mixture from Example No. 1 was mixed with 75 parts each of xylene and methyl isobutyl ketone and allowed to stand for 2 hours in an ultrasound disperser. Fifty parts of this mixture was charged to a ball mill along with 260 parts of a vinyl solution, 50 parts each of methyl isobutyl ketone and xylene. To about 1 part by weight of this mixture was added about 1 part by weight of glass beads of about 5 mm in diameter. The vinyl solution was a 12.4 percent solution of equal parts of vinyl resins VMCH and VAGH, both from Union Carbide, prepared in a 1:1 mixture of xylene and methyl isobutyl ketone. The sample was milled for 24 hours and discharged.

EXAMPLE NO. 3

The coating formulation prepared in Example No. 2 was coated on polyester and vinyl films at approximately 1 mil thickness and allowed to dry in an air circulated oven at 77° C. The samples registered surface resistivities of $22 \times 10^3$ and $16 \times 10^3$ Ohms/Square respectively.

EXAMPLE NO. 4

One hundred parts of the dispersion of Example No. 1 was dissolved in 100 parts of toluene by soaking it overnight. Eighty parts of this solution was charged to a ball mill containing 400 parts of Acrylic B-72 resin solution from Rohm & Haas. Glass beads as in Example No. 2 were added in about a 1:1 ratio by weight with the mixture. The charge was milled for 24 hours. A 1 mil coating on polyester had a surface resistivity of $2.5 \times 10^3$ Ohms/Square.

EXAMPLE No. 5

A dispersion of doped polyaniline in vinyl chloride/vinyl acetate copolymer was prepared by mixing 23 parts of the copolymer, 50 parts of doped polyaniline, 20 parts of a sulfonamide plasticizer, 5 parts of an organic phosphate type surfactant, 1 part of barium cadmium stabilizer and 1 part of processing aid on a two roll mill at 150° C. The composition had a conductivity of 4.2 S/cm.

EXAMPLE NO. 6

Eighty parts of the dispersion of Example No. 5 was mixed with 75 parts each of xylene and methyl isobutyl ketone in an ultrasound disperser for 2 hours. Fifty parts of the above solution was charged to a ball mill containing 260 parts of the vinyl solution of Example No. 2, and 50 parts each of xylene and methyl isobutyl ketone, and glass beads as above in a ratio by weight of about 1:1 with the mixture, and milled for 24 hours, after which it was discharged into a storage container. One rail coatings on polyester and vinyl showed surface resistivities of $20.3 \times 10^3$ Ohms/Square and $9.9 \times 10^3$ Ohms/Square, respectively.

EXAMPLE NO. 7

In order to assess the comparative advantage of the coatings of this invention, samples of other types of polyaniline coats were prepared as follows. Two types of conductive polyanilines were prepared by doping polyaniline (PAni) with p-toluenesulfonic acid (OTsH) and octanesulfonic acid (OSH). These polyanilines were dissolved in 95 percent formic acid (HCOOH) to produce an apparent solution with a concentration of 1 percent by weight polyaniline. Another type of blend coating was made by additionally dissolving 2 percent by weight of nylon 6 (N6) in the solution of PAni OTs. These solutions were then coated on a film of a chlorofluorpolymer (Aclar®, a product of Allied-Signal, Inc.) by dipping and then drying at 70° to 80° C. for 10 minutes. The conductivity and surface resistance (measured in ohms per square) of each film was then measured by a four-point probe technique. The coated film samples were then immersed in aleionized water for 24 hours and the conductivity and surface resistance of each film was then remeasured. The results are summarized in Table I. All of the films exhibited a transparency to visible light of greater than 40 percent. Only the sample with the coating of this invention was able to retain its conductivity at or above its initial value. All the other samples dramatically lost conductivity and exhibited a green to blue color transition which is indicative of the loss of dopant and a conversion to neutral polyaniline. Only the sample of this invention retained its green color. Although the coating which contained nylon 6 also comprised a dispersion of polyaniline in a thermoplastic matrix, the nylon 6 matrix polymer evidently possessed insufficient barrier properties with respect to the transport of water and the dopant.

TABLE I

| Coating Formulation | Before Soaking | | After Soaking | |
|---|---|---|---|---|
| | $R_s$ (ohm/sq) | $\sigma$ (S/cm) | $R_s$ (ohm/sq) | $\sigma$ (S/cm) |
| 1% PAni OTs in HCOOH | $3 \times 10^4$ | >0.4 | $3 \times 10^7$ | $3 \times 10^{-4}$ |
| 1% PAni Octane-sulfonate in HCOOH | $1 \times 10^5$ | — | $>10^{10}$ | — |
| 1% PAni OTs + 2% Nylon 6 in HCOOH | $7 \times 10^5$ | — | $>10^{10}$ | — |
| Formulation of Example 2 | $8 \times 10^4$ | $1 \times 10^{-2}$ | $3 \times 10^4$ | $3 \times 10^{-2}$ |

EXAMPLE NO. 8

The coating characteristics of the formulations of Example No. 7 were evaluated on a variety of substrates by dipping the substrate into the coating formulation and withdrawing it with the normal to the substrate perpendicular to the normal to the liquid surface. Results are summarized in Table II where the following definitions are employed: "Moderate Wetting" means large regions of the surface (>50 percent) covered by continuous coating; "Good Wetting" means entire surface coated; "Very Good Wetting" means entire surface coated with uniformly thick coating; "Poor Adhesion" means readily removed by rubbing or scratching with soft object (cotton swab or paper towel); "Moderate Adhesion" means partially removable by rubbing; "Good Adhesion" means not removable by rubbing; "Very Good Adhesion" means not removable by rubbing and only partially (<than about 50 percent) removable by Scotch Brand TM adhesive tape contacted to the surface and pulled at a 45° angle; and, "Excellent Adhesion" means not removable by rubbing or Scotch tape.

TABLE II

| Coating Formulation | Substrate | Properties of Coating |
|---|---|---|
| 1 percent PAni OTs in HCOOH | PET[1] | Good Wetting, Moderate Adhesion |
| | Aclar[2] | Moderate Wetting, Good Adhesion |
| | PP[3] | Moderate Wetting, Good Adhesion |
| | PVC[4] | Good Wetting, Good Adhesion |
| 1 percent PAni OS in HCOOH | PET | Good Wetting, Excellent Adhesion |
| | Aclar | Good Wetting, Very Good Adhesion |
| | PP | Good Wetting, Good Adhesion |
| | PVC | Good Wetting, Excellent Adhesion |
| 1 percent PAni OTs + 2 percent N6 in HCOOH | PET | Excellent Wetting, Excellent Adhesion |
| | Aclar | Excellent Wetting, Good Adhesion |
| | PP | Excellent Wetting, Good Adhesion |
| Formulation of Example 2 | PET | Excellent Wetting, Excellent Adhesion |
| | Aclar | Excellent Wetting, Good Adhesion |
| | PP | Excellent Wetting, Good Adhesion |
| | PVC | Excellent Wetting, Excellent Adhesion |

[1]PET = Polyethyleneterephthalate
[2]Aclar ® is a trademark of Allied-Signal Corporation and is composed of a copolymer of chlorotrifluoroethylene and vinylidene difluoride
[3]PP = polypropylene
[4]PVC = poly(vinyl chloride)

Thus, it should be evident that highly effective conductive compositions and films and a method of preparing such compositions and films are provided by the present invention. The intrinsically conductive polymers, thermoplastics, solvents and dispersion/film enhancing additives discussed herein are exemplary, and any such ingredients which will satisfy the requirements of the invention as disclosed hereinabove, are considered to be within the scope of the invention. It is, therefore, to be understood that any variations evident fall within the scope of the claimed invention and thus, the selection of specific comment elements can be determined without departing from the spirit of the invention herein disclosed and described. Thus, the scope of the invention shall include all modifications and variations that may fall within the scope of the attached claims.

What is claimed is:

1. An electrically conductive coating composition comprising:

a dispersion comprising dispersed particle of an intrinsically conductive polymer and, a solution which comprises a hydrophobic film-forming thermoplastic polymer, a highly polar plasticizer, and, an acid anhydride surfactant, in an organic solvent;

wherein said thermoplastic polymer is soluble in said solvent to at least 1 percent by weight; and, wherein said dispersion comprises from about 1 to about 50 percent by weight of said intrinsically conductive polymer.

2. A coating composition as set forth in claim 1, wherein said particles of the intrinsically conductive polymers have a particle size equal to or less than 400 nanometers.

3. A coating composition as set forth in claim 2, wherein said hydrophobic polymer is selected from the group consisting of poly(vinyl chloride), poly(methylmethacrylate), styrenic polymers, copolymers and mixtures thereof.

4. A coating composition as set forth in claim 1, wherein said thermoplastic polymer is selected from the group consisting of acrylic polymers; polyester; polycarbonates; polyvinyl chloride and copolymers thereof with vinyl acetate; and, styrenic polymers.

5. A coating composition as set forth in claim 1, wherein the composition further comprises at least one additional film-forming resin; wherein the ratio of said thermoplastic polymer to said at least one additional film-forming resin is from about 1:0.1 to about 1:25 by weight.

6. A coating composition as set forth in claim 5, wherein said additional film-forming resin is selected from the group consisting of vinyl and acrylic resins, styrenics, polyesters, polyurethanes and mixtures thereof.

7. A coating composition as set forth in claim 1, further comprising an effective amount of at least one dispersion or film enhancing additive.

8. A coating composition as set forth in claim 2, wherein said intrinsically conductive polymer is doped substituted or unsubstituted polyaniline.

9. A coating composition as set forth in claim 2, wherein said organic solvent is selected from the group consisting of toluene, acetone, methyl ethyl ketone, dimethylsulfoxide, N-methyl pyrrolidone, gama-butyrolactone, cyclohexanone, xylene and methyl isobutylketone, and said thermoplastic polymer is selected from the group consisting of acrylic polymers; polyesters; polycarbonates; polyvinyl chloride and copolymers thereof with vinyl acetate; and, styrenic polymers.

10. An article comprising:

a substrate; and, an electrically conductive coating on a surface of said substrate wherein said coating has adhesion to said substrate, said coating comprising from about 99 to about 50 percent by weight of a matrix having a film-forming material comprising a hydrophobic thermoplastic polymer, a highly polar plasticizer and an acid anhydride surfactant; and from about 1 to about 50 percent by weight of a dispersed phase comprising particle of an intrinsically conductive polymer, and said particles having a particle size equal to or less than about 400 nanometers and the loading of said particle and the thickness of the coating is such that said coating is transmissible to at least about 10 percent of the energy of the visible light spectrum.

* * * * *